United States Patent
Mlcak et al.

(10) Patent No.: US 12,247,480 B2
(45) Date of Patent: Mar. 11, 2025

(54) LOWER-DENSITY OR COLLIMATING WELL-LOGGING RADIATION DETECTOR WINDOWS

(71) Applicant: Schlumberger Technology Corporation, Sugar Land, TX (US)

(72) Inventors: Justin Mlcak, Richmond, TX (US); Sicco Beekman, Houston, TX (US); Avtandil Tkabladze, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 201 days.

(21) Appl. No.: 18/006,167

(22) PCT Filed: Jul. 23, 2021

(86) PCT No.: PCT/US2021/042933
§ 371 (c)(1),
(2) Date: Jan. 20, 2023

(87) PCT Pub. No.: WO2022/020699
PCT Pub. Date: Jan. 27, 2022

(65) Prior Publication Data
US 2023/0258073 A1    Aug. 17, 2023

Related U.S. Application Data

(60) Provisional application No. 63/055,411, filed on Jul. 23, 2020.

(51) Int. Cl.
G01V 5/08    (2006.01)
E21B 47/11    (2012.01)

(52) U.S. Cl.
CPC .............. *E21B 47/111* (2020.05); *G01V 5/08* (2013.01)

(58) Field of Classification Search
CPC .............................. E21B 47/111; G01V 5/08
See application file for complete search history.

(56) References Cited

U.S. PATENT DOCUMENTS 4,342,911 A * 8/1982 French ..................... G01V 5/08
250/257
4,611,700 A    9/1986 Despres
(Continued)

OTHER PUBLICATIONS

International Search Report and Written Opinion issued in PCT Application PCT/US2021/042933, dated Nov. 4, 2021 (11 Pages).
(Continued)

*Primary Examiner* — Dani Fox
*Assistant Examiner* — Fani Polyzos Boosalis
(74) *Attorney, Agent, or Firm* — Jeffrey D. Frantz

(57) ABSTRACT

Systems, methods, and devices are provided for radiation detector windows that have an improved shape or density and/or provide collimation of radiation that passes through. Thus, a radiation-based logging tool may include a source that emits radiation and a detector that detects, through a detector window, a first portion of the radiation scattered off of a geological formation. The detector window may include a dome having a first surface and a second surface and a support structure that provides support for the dome. The detector window may include a window insert that shields the detector from a second portion of the radiation.

20 Claims, 14 Drawing Sheets

(56) References Cited

U.S. PATENT DOCUMENTS

| | | |
|---|---|---|
| 5,982,562 A | 11/1999 | Rode |
| 2003/0155121 A1 | 8/2003 | Jones |
| 2006/0102834 A1 | 5/2006 | Mickael |
| 2011/0204216 A1 | 8/2011 | Moake |
| 2015/0053393 A1 | 2/2015 | Ortiz et al. |
| 2016/0306070 A1 | 10/2016 | Simon |

OTHER PUBLICATIONS

International Preliminary Report on Patentability issued in PCT Application PCT/US2021/042933 dated February 2, 2023, 7 pages.
Extended Search Report issued in European Patent Application No. 21846581.3 dated Jul. 1, 2024, 6 pages.
Substantive Examination issued in Saudi Arabia Patent Application No. 523442266 dated Aug. 29, 2024, 12 pages with English translation.

\* cited by examiner

LOWER-DENSITY OR COLLIMATING WELL-LOGGING RADIATION DETECTOR WINDOWS

BACKGROUND

This disclosure relates to radiation detector windows for a radiation-based well logging tool. More particularly, this disclosure relates to radiation detector windows that may have a lower effective density and/or may provide a collimation of the radiation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed into the wellbore. The tools may be used to infer properties and characteristics of the geological formation surrounding the wellbore and, thus, make informed decisions. Some such tools may include a radiation generator that may irradiate the geological formation with nuclear or photonic radiation, and radiation detectors to detect the radiation that returns after interacting with the geological formation. This allows inferences to be made about the geological formation based on the way that the radiation changes in response to interacting with the geological formation.

Thus, a radiation detector in the downhole tool is used to detect the radiation that has interacted with the geological formation. The signal from the detector may be used to identify certain material properties of the geological formation at that depth in the wellbore, such as porosity, hydrogen content, lithology, or the like. To ensure that the radiation detector "sees" radiation that has interacted with the geological formation, the downhole tool may have radiation detector windows that allows the radiation to pass through from outside the downhole tool into the radiation detectors. Radiation that does not pass through the windows, instead passing through other materials that make up the downhole tool, may be attenuated and, thus, may not be as noticeable to the radiation detector. Indeed, radiation that strikes the detector not through the radiation detector windows may not provide useful information about the geological formation, and thus may be considered noise. The radiation detector windows, however, may be formed from materials that may have material properties that make them less desirable than certain other materials.

In some cases, an additional collimating radiation shield may be placed between the radiation detector window and the radiation detector. This additional radiation shield provides for a collimation effect of the radiation that reaches the detector, so that the detector may primarily detect radiation from a particular angle out of the downhole tool. This may allow certain radiation detectors of the downhole tool to gather information about particular areas of interest, such as from a particular depth of investigation away from the downhole tool or facing a particular azimuthal angle. These additional collimating radiation shields, however, may add to the size and weight of the downhole tool.

BRIEF DESCRIPTION OF THE DRAWINGS

Various aspects of this disclosure may be better understood upon reading the following detailed description and upon reference to the drawings in which.

DETAILED DESCRIPTION

Figure 1:
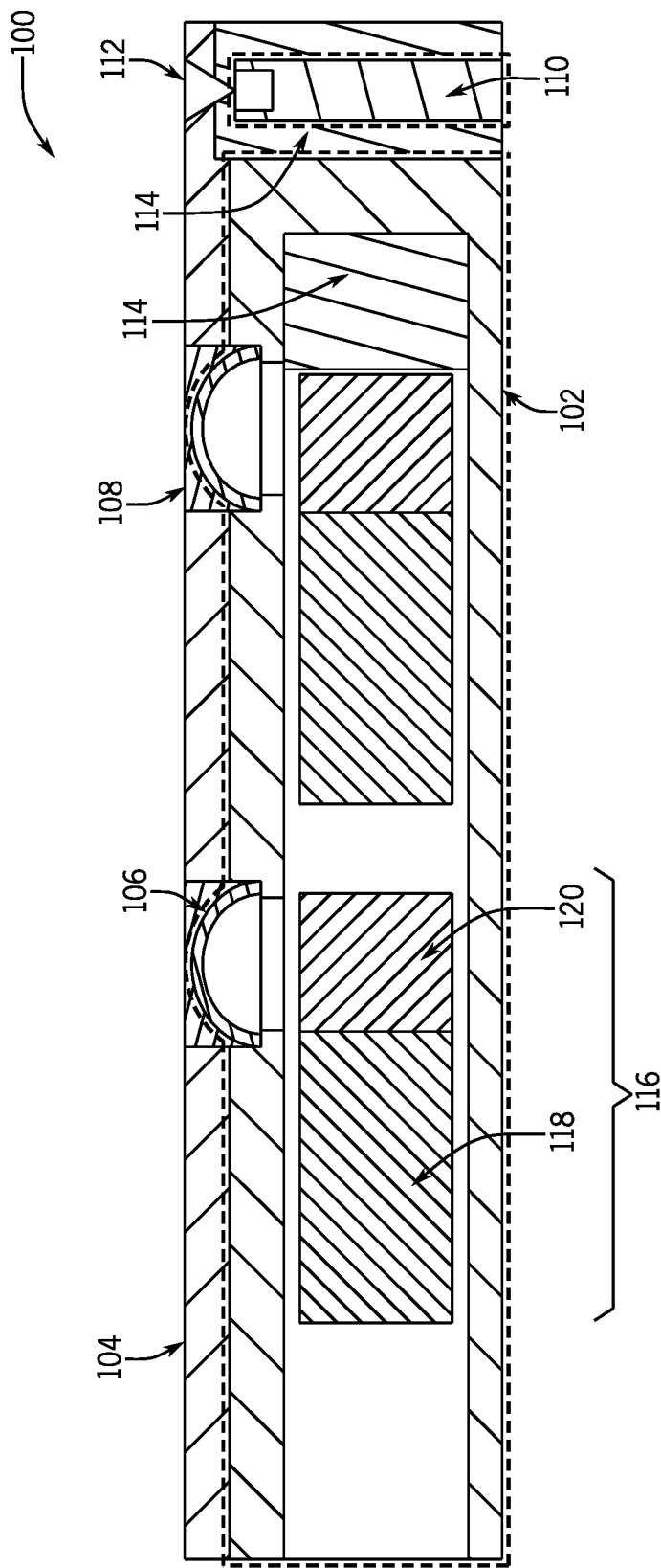
FIG. 1 depicts a schematic cross section diagram of a formation density logging tool, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As mentioned above, a radiation-based downhole tool may emit radiation into a geological formation and detect the radiation after it has interacted with the geological formation. Such a radiation-based downhole tool may include a photonic radiation source (e.g., a radioisotopic source such as cesium (e.g., $^{137}$Cs), an x-ray generator) or a neutron source (e.g., an electronic neutron generator). In one example, a formation density tool may include a source to emit high-energy photons into the geological formation. While this disclosure generally refers to a formation density tool by way of example, it should be understood that the systems and methods of this disclosure may be used with any suitable radiation-based downhole tool that uses radiation detector windows. Continuing with the example of a formation density tool, some of the high-energy photons may be scattered by the geological formation and then detected by one or more detectors on the formation density tool. The physical properties of the geological formation may be determined from the characteristics of the detected high-energy photons. The accuracy of the determined physical properties depends on the ability of the downhole tool to capture photons travelling through the formation at the one or more detectors. Restricting the direct passage of photons from the source to the one or more detectors inside the formation density tool without travelling through the formation increases the accuracy of the determined physical properties. Accordingly, as will be described in more detail below, the present disclosure provides techniques to ensure that more accurate physical properties of a geological formation are determined by providing shielding and/or collimation for detectors in a formation density logging tool.

Turning now to the figures, FIG. 1 depicts a schematic diagram of a formation density logging tool 100 that may obtain physical properties of a geological formation, in accordance with an embodiment. The formation density logging tool 100 may be a component of a wireline or slickline tool or bottom-hole assembly (BHA) as a logging-while-drilling (LWD) or measurement-while-drilling (MWD) tool. The formation density logging tool 100 may transmit measurements that may be stored and processed downhole or may be sent to the surface for processing.

The formation density logging tool 100 may include a first housing 102, an external shield 104, one or more detector windows 106, one or more detector window covers 108, a source 110, a source aperture 112, one or more shielding inserts 114, and one or more detectors 116. The source 110 may be any suitable radiation source (e.g., a nuclear or photonic radiation source). For instance, the source 110 may be photon source, such as an x-ray generator, a gamma ray generator, a cesium source, or any other suitable source that emits photons, such as x-rays, gamma rays, or other high-energy photons. High-energy photons may include photons at an energy sufficient to cause at least a portion of the photons to inelastically scatter off elements of the geological formation and to be absorbed by the one or more detectors 116 (e.g., Compton scattering). The source 110 emits the photons such that at least some of the photons enter the geological formation. At least some of the photons may interact with the geological formation (e.g., scatter) and may be redirected towards the one or more detectors 116. In certain embodiments, at least one of the one or more detectors 116 may be a short-spaced detector and at least one of the one or more detectors 116 may be a long-spaced detector located farther from the source 110 than the short-spaced detector.

Each of the one or more detectors 116 may include a scintillator 120 that absorbs the photons and emits light based on the energy of the absorbed photons. For example, each emission of light may count as a detected photon (e.g., thereby adding one to a count rate of the detector). Each of the one or more detectors 116 may also include a photomultiplier 118 operatively coupled to the scintillator 120 to detect the light emitted by the scintillator 120. The photomultiplier 118 may output an electrical signal from the detected light of the scintillator. Processing of the electrical signals from the photomultiplier 118 may be performed at a data processing system at the surface and/or at a data processing system within the BHA.

The one or more detector windows 106 may be at least partially disposed in one or more recesses of the first housing 102. Further, the one or more detector windows 106 may be at least partially disposed in one or more recesses of the external shield 104. The one or more detector windows 106 may be capable of withstanding high wellbore pressures. For example, the one or more detector windows 106 may be capable of withstanding at least seventy megapascals (MPa).

The one or more detector windows 106 may have a small photoelectric cross section. For example, the one or more detector windows 106 may be formed of a material having a low atomic number. In one example, the one or more detector windows 106 may be formed of a material having an atomic number less than twenty-three. Additionally or alternatively, the one or more detector windows 106 may have a small Compton cross section. For example, the one or more detector windows 106 may be formed of a material having a low density. For example, the one or more detector windows 106 may be formed of a material having a density less than five grams per cubic centimeter. In certain embodiments, the one or more detector windows 106 may be formed of at least one of beryllium, titanium, an alloy of beryllium, an alloy of titanium, a carbon composite, a layered aluminum, or any combination thereof. The one or more detector windows 106 may be coupled to the first housing 102. For example, the one or more detector windows 106 may be welded, brazed, sealed with elastomeric materials, or any other suitable form of sealing. The one or more detector window covers 108 may surround an outer surface of the one or more detector windows 106.

Shielding inserts 114 may prevent leakage of high-energy photons from the source 110 through an interior of the formation density logging tool 100 to the one or more detectors 116. At least one of the shielding inserts 114 may be disposed about the source 110. The at least one of shielding inserts 114 disposed about the source 110 may include an aperture. The aperture may allow passage of high-energy photons from the source 110. The aperture may be substantially aligned with the source aperture 112. The source aperture 112 may be formed within a portion of the external shield 104. The source aperture 112 may allow passage of high-energy photons from the source 110 to an exterior of the formation density logging tool 100. The source aperture 112 may allow passage of high-energy photons from the source 110 to a geological formation.

Figure 2A:
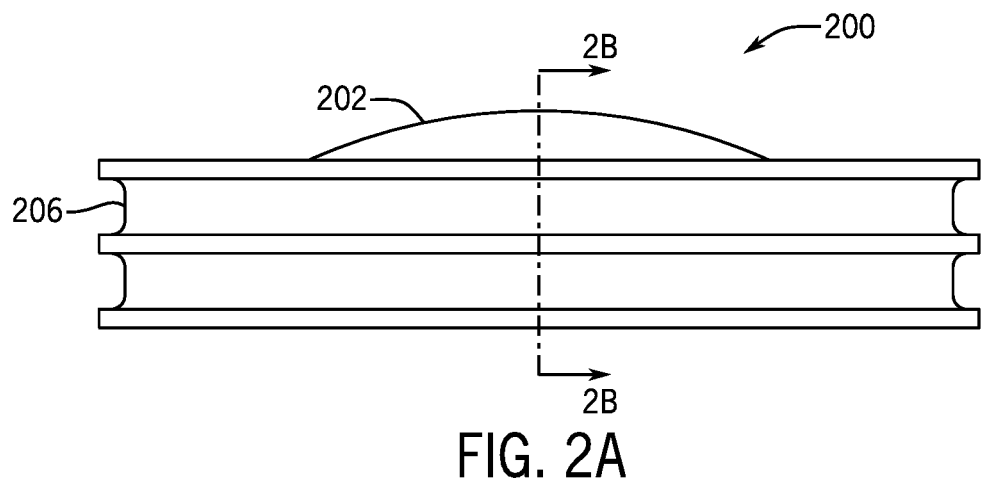
FIG. 2A depicts a schematic diagram of an example detector window having a dome, in accordance with an embodiment.
Figure 2B:
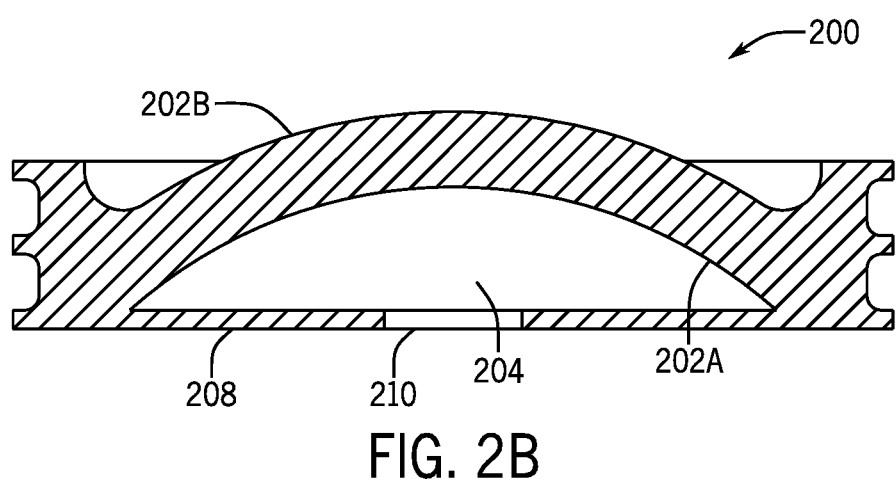
FIG. 2B depicts a schematic cross section diagram of the detector window of FIG. 2A, in accordance with an embodiment.

With the preceding in mind, FIGS. 2A and 2B depict a schematic diagram and a schematic cross section diagram of a detector window 200 for a formation density logging tool having a dome 202 and an interval cavity 204, in accordance with an embodiment. The detector window 200 may be disposed in a recess of a formation density logging tool, such as formation density logging tool 100 in FIG. 1. The detector window 200 may include the dome 202, the internal cavity 204, a set of flanges 206, a wall 208, and an aperture 210. The detector window 200 may be generally circular or take any other suitable shape along an outer surface of the downhole tool (e.g., rectangular, square). Each flange of the set of flanges 206 may receive an elastomeric O-ring. The elastomeric O-ring may seal against the set of flanges 206 and a recess of the housing of the formation density logging tool. The elastomeric O-ring may prevent entry of wellbore fluids into an interior of the housing of the formation density logging tool. In certain embodiments, the detector window 200 may be welded and/or brazed in the recess of the housing of the formation density logging tool (e.g., in which case the elastomeric O-ring may be present or ab sent).

The dome 202 may be an exterior dome. For example, the dome 202 may face outwards from the formation density logging tool and/or towards a geological formation when the formation density logging tool is deployed in a wellbore. The dome 202 may be a solid dome. The dome 202 may have an arcuate shape at a first surface 202A and/or a second surface 202B. The first surface 202A may be an inner surface. For example, the first surface 202A may face the interior cavity 204. The second surface 202B may be an outer surface. For example, the second surface 202B may face away from the interior cavity 204. In some embodiments, the interior cavity 204 may be filled with a material. For example, the interior cavity 204 may be filled by inserting a material through the aperture 210. The aperture 210 may be formed through the wall 208. The wall 208 may be an interior wall. For example, the wall 208 may face towards an interior of the formation density logging tool.

Figure 3A:
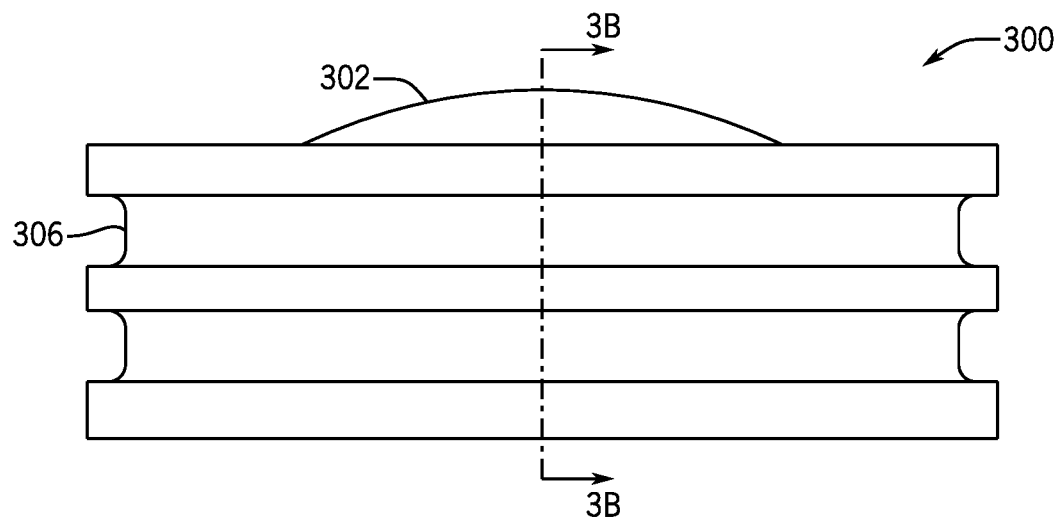
FIG. 3A depicts a schematic diagram of a detector window having a shell dome, in accordance with an embodiment.
Figure 3B:
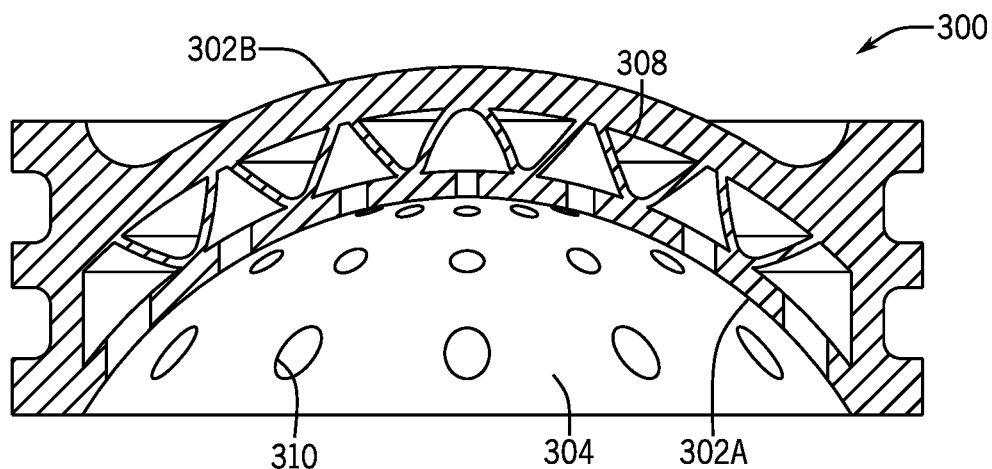
FIG. 3B depicts a schematic cross section diagram of the detector window of FIG. 3A, in accordance with an embodiment.

With the preceding in mind, FIGS. 3A and 3B depict a schematic diagram and a schematic cross section diagram of a detector window 300 for a formation density logging tool having a shell dome 302, in accordance with an embodiment. The detector window 300 may be disposed in a recess of a formation density logging tool, such as formation density logging tool 100 in FIG. 1. The detector window 300 may include the dome 302, an internal cavity 304, a set of flanges 306, a support structure 308, and one or more apertures 310. The detector window 300 may be circular. Each flange of the set of flanges 306 may receive an elastomeric O-ring. The elastomeric O-ring may seal against the set of flanges 306 and a recess of the housing of the formation density logging tool. The elastomeric O-ring may prevent entry of wellbore fluids into an interior of the housing of the formation density logging tool. In certain embodiments, the detector window 300 may be welded and/or brazed in the recess of the housing of the formation density logging tool.

The shell dome 302 may be an exterior dome. For example, the shell dome 302 may face outwards from the formation density logging tool and/or towards a geological formation when the formation density logging tool is deployed in a wellbore. The shell dome 302 may have an arcuate shape at a first surface 302A and/or a second surface 302B. The shell dome 302 may be a hollow dome. For example, the shell dome 302 may include an interior cavity disposed between the first surface 302A and the second surface 302B. The support structure 308 may be disposed between the first surface 302A and the second surface 302B. For example, the support structure 308 may be disposed in an interior cavity of the shell dome 302 between the first surface 302A and the second surface 302B. The support structure 308 may support the dome 302 from wellbore pressure exterior to the formation density logging tool. The support structure 308 may have a corrugated shape. The support structure 308 may be coupled to the first surface 302A and/or the second surface 302B. In certain embodiments, the interior cavity of the shell dome 302 may be filled with a first material. For example, the interior cavity of the shell dome 302 may be filled by inserting the first material through at least one of the one or more apertures 310. The first surface 302A may be an inner surface. For example, the first surface 302A may face the interior cavity 304. The second surface 302B may be an outer surface. For example, the second surface 302B may face away from the interior cavity 304. The one or more apertures 310 may be formed through the first surface 302A. For example, the one or more apertures 310 may be disposed in the first surface 302A.

Figure 4A:
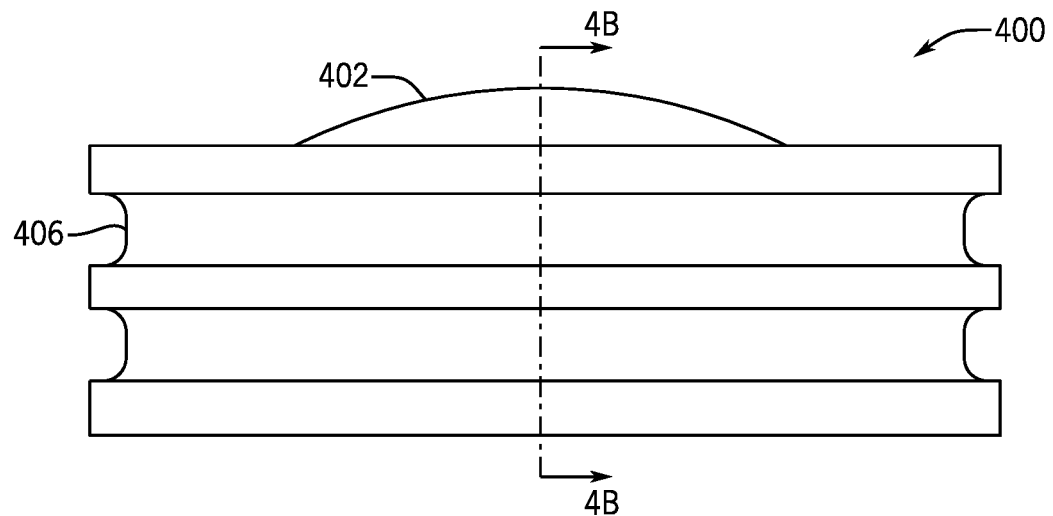
FIG. 4A depicts a schematic diagram of a detector window having a dome and a column structure, in accordance with an embodiment.
Figure 4B:
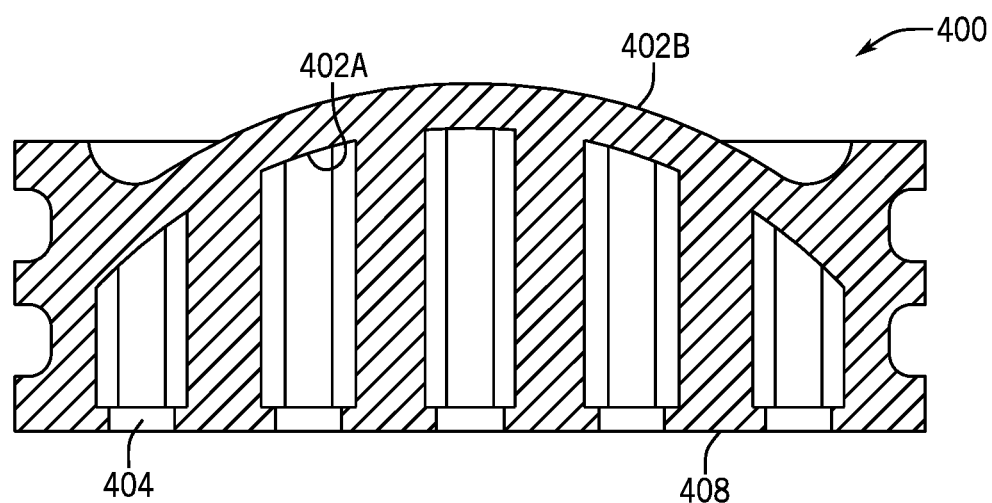
FIG. 4B depicts a schematic cross section diagram of the detector window of FIG. 4A, in accordance with an embodiment.

With the preceding in mind, FIGS. 4A and 4B depict a schematic diagram and a schematic cross section diagram of a detector window 400 for a formation density logging tool having a dome 402 and a column structure 408, in accordance with an embodiment. The detector window 400 may be disposed in a recess of a formation density logging tool, such as formation density logging tool 100 in FIG. 1. The detector window 400 may include the dome 402, an internal cavity 404, a set of flanges 406, and a column structure 408. The detector window 400 may be circular. Each flange of the set of flanges 406 may receive an elastomeric O-ring. The elastomeric O-ring may seal against the set of flanges 406 and a recess of the housing of the formation density logging tool. The elastomeric O-ring may prevent entry of wellbore fluids into an interior of the housing of the formation density logging tool. In certain embodiments, the detector window 400 may be welded and/or brazed in the recess of the housing of the formation density logging tool.

The dome 402 may be an exterior dome. For example, the dome 402 may face outwards from the formation density logging tool and/or towards a geological formation when the formation density logging tool is deployed in a wellbore. The dome 402 may be a solid dome. The dome 402 may have an arcuate shape at a first surface 402A and/or a second surface 402B. The first surface 402A may be an inner surface. For example, the first surface 402A may face the interior cavity 404. The second surface 402B may be an outer surface. For example, the second surface 402B may face away from the interior cavity 404. In some embodiments, the interior cavity 404 may be filled with a material. The column structure 408 may be coupled to the dome 402 at the first surface 402A. The column structure 408 may be a support structure. The column structure 408 may support the dome 402 from wellbore pressure exterior to the formation density logging tool. The column structure 408 may include a plurality of columns. In certain embodiments, each of the plurality of columns may be hollow. In certain embodiments, each of the plurality of columns may have a hexagonal shape. The interior cavity 404 may be a plurality of hollow portions of the plurality of columns. In certain embodiments, each of the plurality of columns includes a hollow portion.

Figure 4C:
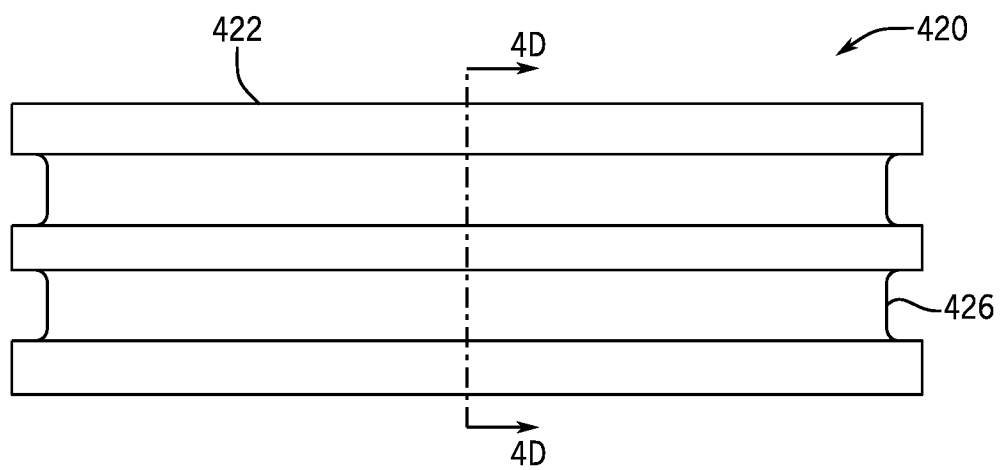
FIG. 4C depicts a schematic diagram of a detector window having a column structure, in accordance with an embodiment.
Figure 4D:
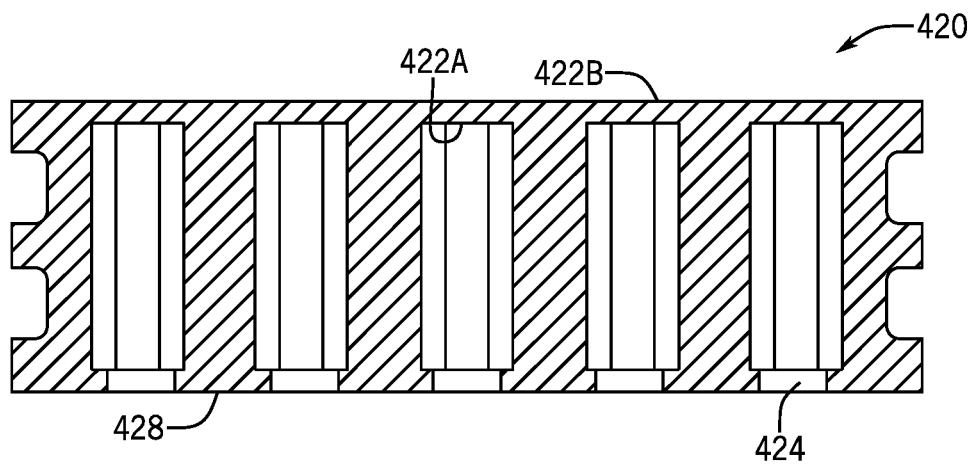
FIG. 4D depicts a schematic cross section diagram of the detector window of FIG. 4C, in accordance with an embodiment.

With the preceding in mind, FIGS. 4C and 4D depict a schematic diagram and a schematic cross section diagram of a detector window 420 for a formation density logging tool having a column structure 428, in accordance with an embodiment. The detector window 420 may be disposed in a recess of a formation density logging tool, such as formation density logging tool 100 in FIG. 1. The detector window 420 may include a cap 422, an internal cavity 424, a set of flanges 426, and the column structure 428. The detector window 420 may be circular. Each flange of the set of flanges 426 may receive an elastomeric O-ring. The elastomeric O-ring may seal against the set of flanges 426 and a recess of the housing of the formation density logging tool. The elastomeric O-ring may prevent entry of wellbore fluids into an interior of the housing of the formation density logging tool. In certain embodiments, the detector window 420 may be welded and/or brazed in the recess of the housing of the formation density logging tool.

The cap 422 may be an exterior cap. For example, the cap 422 may face outwards from the formation density logging tool and/or towards a geological formation when the formation density logging tool is deployed in a wellbore. The cap 422 may be a solid cap. The cap 422 may have a flat shape at a first surface 422A and/or a second surface 422B. The first surface 422A may be an inner surface. For example, the first surface 422A may face the interior cavity 424. The second surface 422B may be an outer surface. For example, the second surface 422B may face away from the interior cavity 424. In some embodiments, the interior cavity 424 may be filled with a material. The column structure 428 may be coupled to the dome 422 at the first surface 422A. The column structure 428 may support the cap 422 from wellbore pressure exterior to the formation density logging tool. The column structure 428 may include a plurality of columns. In certain embodiments, each of the plurality of columns may be hollow. In certain embodiments, each of the plurality of columns may have a hexagonal shape. The interior cavity 424 may be a plurality of hollow portions of the plurality of columns. In certain embodiments, each of the plurality of columns includes a hollow portion.

Figure 5A:
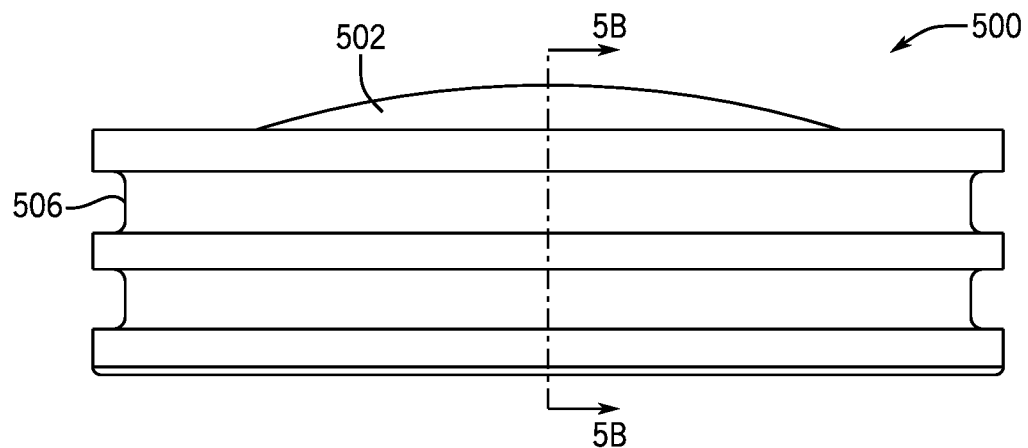
FIG. 5A depicts a schematic diagram of a detector window having a truss structure, in accordance with an embodiment.
Figure 5B:
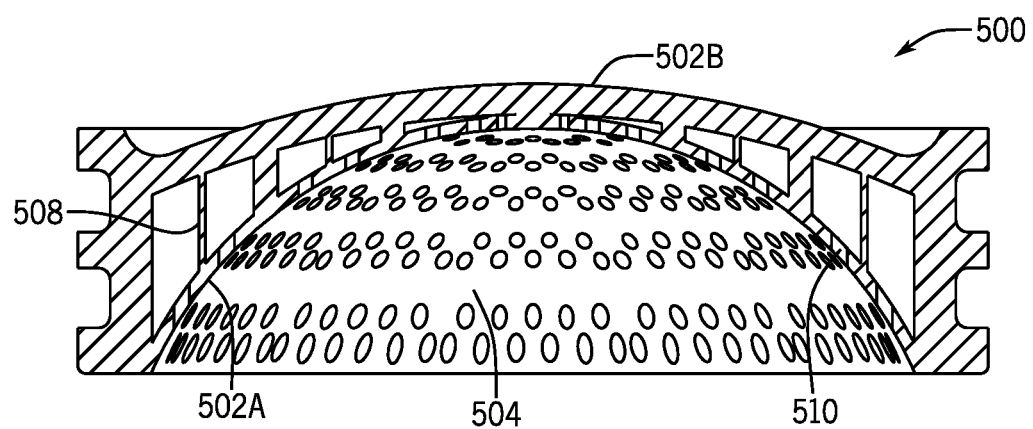
FIG. 5B depicts a schematic cross section diagram of the detector window of FIG. 5A, in accordance with an embodiment.

With the preceding in mind, FIGS. 5A and 5B depict a schematic diagram and a schematic cross section diagram of a detector window 500 for a formation density logging tool having a dome 502 and a truss structure 508, in accordance with an embodiment. The detector window 500 may be disposed in a recess of a formation density logging tool, such as formation density logging tool 100 in FIG. 1. The detector window 500 may include the dome 502, an internal cavity 504, a set of flanges 506, the truss structure 508, and one or more apertures 510. The detector window 500 may be circular. Each flange of the set of flanges 506 may receive an elastomeric O-ring. The elastomeric O-ring may seal against the set of flanges 506 and a recess of the housing of the formation density logging tool. The elastomeric O-ring may prevent entry of wellbore fluids into an interior of the housing of the formation density logging tool. In certain embodiments, the detector window 500 may be welded and/or brazed in the recess of the housing of the formation density logging tool.

The dome 502 may be an exterior dome. For example, the dome 502 may face outwards from the formation density logging tool and/or towards a geological formation when the formation density logging tool is deployed in a wellbore. The dome 502 may have an arcuate shape at a first surface 502A and/or a second surface 502B. The dome 502 may be a hollow dome. For example, the dome 502 may include an interior cavity between the first surface 502A and the second surface 502B. The truss structure 508 may be disposed between the first surface 502A and the second surface 502B. For example, the truss structure 508 may be disposed in an interior cavity of the dome 502 between the first surface 502A and the second surface 502B. The truss structure 508 may support the dome 502 from wellbore pressure exterior to the formation density logging tool. The truss structure 508 may include a plurality of columns. In certain embodiments, the truss structure 508 may include a plurality of spokes, ribs, or concentric rings. The truss structure 508 may be coupled to the first surface 502A and/or the second surface 502B. In certain embodiments, the interior cavity of the dome 502 may be filled with a first material. For example, the interior cavity of the dome 502 may be filled by inserting the first material through at least one of the one or more apertures 510. The first surface 502A may be an inner surface. For example, the first surface 502A may face the interior cavity 504. The second surface 502B may be an outer surface. For example, the second surface 502B may face away from the interior cavity 504. In certain embodiments, the first surface 502A may have a greater curvature than the second surface 502B. In some embodiments, the interior cavity 504 may be filled with a material. The one or more apertures 510 may be formed through the first surface 502A. For example, the one or more apertures 510 may be disposed in the first surface 502A.

Figure 6A:
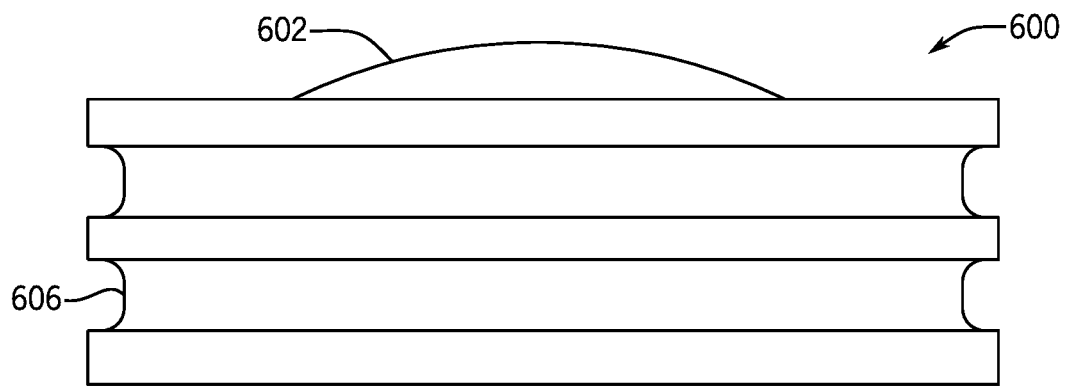
FIG. 6A depicts a schematic diagram of a detector window having a hub and spoke structure, in accordance with an embodiment.
Figure 6B:
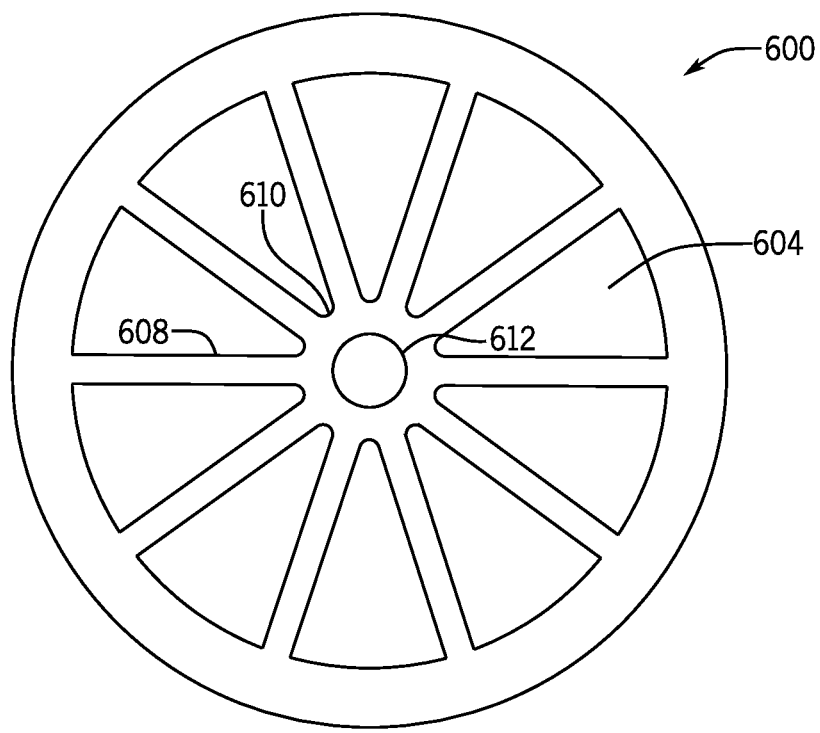
FIG. 6B depicts a schematic cross section diagram of the detector window of FIG. 6A, in accordance with an embodiment.

With the preceding in mind, FIGS. 6A and 6B depict a schematic diagram and a schematic cross section diagram of a detector window 600 for a formation density logging tool having a hub 610 and spoke 608 structure, in accordance with an embodiment. The detector window 600 may be disposed in a recess of a formation density logging tool, such as formation density logging tool 100 in FIG. 1. The detector window 600 may include a dome 602, an internal cavity 604, a set of flanges 606, one or more spokes 608, the hub 610, and an aperture 612. The detector window 600 may be circular. Each flange of the set of flanges 606 may receive an elastomeric O-ring. The elastomeric O-ring may seal against the set of flanges 606 and a recess of the housing of the formation density logging tool. The elastomeric O-ring may prevent entry of wellbore fluids into an interior of the housing of the formation density logging tool. In certain embodiments, the detector window 600 may be welded and/or brazed in the recess of the housing of the formation density logging tool.

The dome 602 may be an exterior dome. For example, the dome 602 may face outwards from the formation density logging tool and/or towards a geological formation when the formation density logging tool is deployed in a wellbore. The dome 602 may be a solid dome. The dome 602 may have an arcuate shape at a first surface and/or a second surface. The first surface may be an inner surface. For example, the first surface may face the interior cavity 604. The hub 610 may be disposed in a center of the detector window 600. The hub 610 may be a column. In certain embodiments, the hub 610 may have a hollow portion. The aperture 612 may be formed through the hub 610. The one or more spokes 608 may extend radially outward from the hub 610. Each of the one or more spokes 608 may be a wall. The one or more spokes 608 may be coupled to the first, or inner, surface of the dome 602. The one or more spokes 608 may support the dome 602 from wellbore pressure exterior to the formation density logging tool. The second surface may be an outer surface. For example, the second surface may face away from the interior cavity 604. In some embodiments, the interior cavity 604 may be filled with a material. The interior cavity 604 may include a plurality of hollow portions disposed between the one or more spokes 608.

Figure 7A:
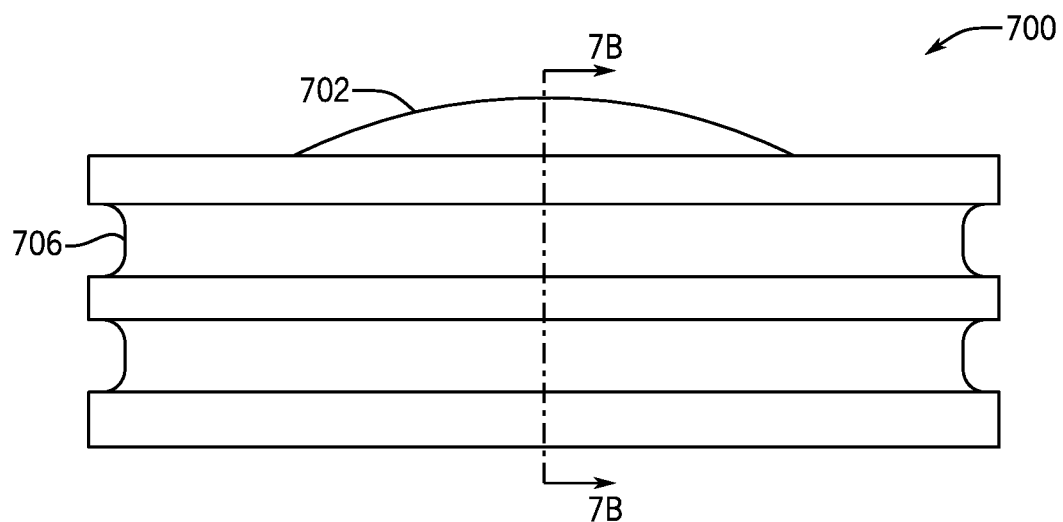
FIG. 7A depicts a schematic diagram of a detector window having a collimating aperture, in accordance with an embodiment.
Figure 7B:
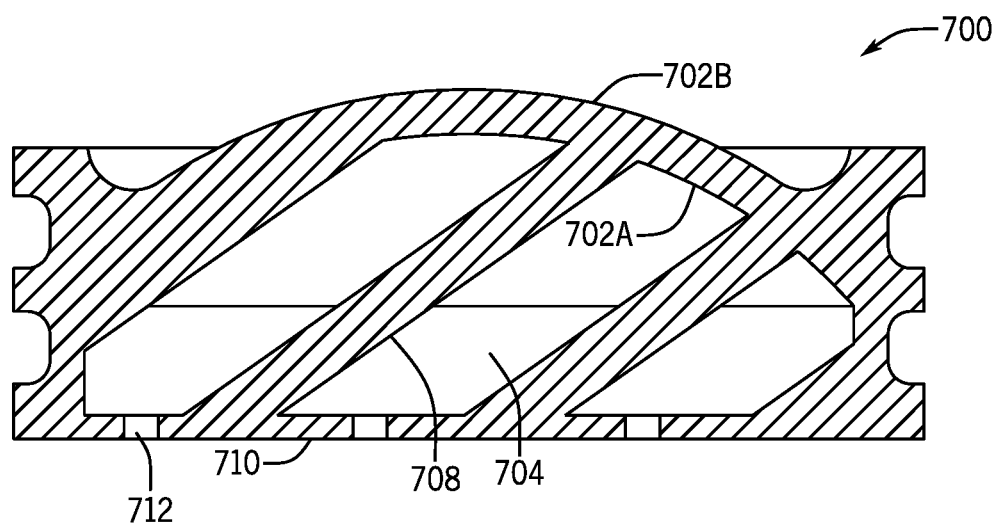
FIG. 7B depicts a schematic cross section diagram of the detector window of FIG. 7A, in accordance with an embodiment.

With the preceding in mind, FIGS. 7A and 7B depict a schematic diagram and a schematic cross section diagram of a detector window 700 for a formation density logging tool having a dome 702 and a collimating aperture 704, in accordance with an embodiment. The detector window 700 may be disposed in a recess of a formation density logging tool, such as formation density logging tool 100 in FIG. 1. The detector window 700 may include the dome 702, the collimating aperture 704, a set of flanges 706, a collimating wall 708, an interior wall 710, and one or more apertures 712. The detector window 700 may be circular. Each flange of the set of flanges 706 may receive an elastomeric O-ring. The elastomeric O-ring may seal against the set of flanges 706 and a recess of the housing of the formation density logging tool. The elastomeric O-ring may prevent entry of wellbore fluids into an interior of the housing of the formation density logging tool. In certain embodiments, the detector window 700 may be welded and/or brazed in the recess of the housing of the formation density logging tool.

The dome 702 may be an exterior dome. For example, the dome 702 may face outwards from the formation density logging tool and/or towards a geological formation when the formation density logging tool is deployed in a wellbore. The dome 702 may be a solid dome. The dome 702 may have an arcuate shape at a first surface 702A and/or a second surface 702B. The first surface 702A may be an inner surface. For example, the first surface 702A may face the collimating window 704. The second surface 702B may be an outer surface. For example, the second surface 702B may face away from the collimating window 704. The collimating window 704 may collimate photons traveling through the detector window 700 in a diagonal direction. The collimating window 704 may be disposed between adjacent collimating walls 708. The collimating wall 708 may be disposed between the first surface 702A of the dome 702 and the interior wall 710. The collimating wall 708 may support the dome 702 from wellbore pressure exterior to the formation density logging tool. In some embodiments, the collimating window 704 may be filled with a material. For example, the collimating window 704 may be filled by inserting a material through the one or more apertures 712. The one or more apertures 712 may be formed through the interior wall 710. The interior wall 710 may face towards an interior of the formation density logging tool.

Any of the detector windows 200, 300, 400, 420, 500, 600, 700 may be formed by an additive manufacturing process. An additive manufacturing process, sometimes referred to as "3D printing," is the manufacturing of an object by the deposition of layers of material (e.g., one layer on top of another) until the completed object is formed. An additive manufacturing process may allow the formation of internal support structures, such as in FIGS. 3B, 4B, 4D, 5B, 6B, and 7B. In some embodiments of an additive manufacturing process, support material may be provided to support layers of the detector window during the layer deposition. In certain embodiments of an additive manufacturing process, the support material may be removed through one or more apertures in the detector window. In certain embodiments, any of the detector windows 200, 300, 400, 420, 500, 600, 700 may be disposed in a recess of a logging tool with a concave domed surface facing outwards from the logging tool. The internal support structures (e.g., 308, 408, 428, 508, 608, 708) of the detector windows may provide sufficient support to withstand wellbore pressures while also reducing an effective density of the detector window by using less material than a solid detector window.

Figure 8:
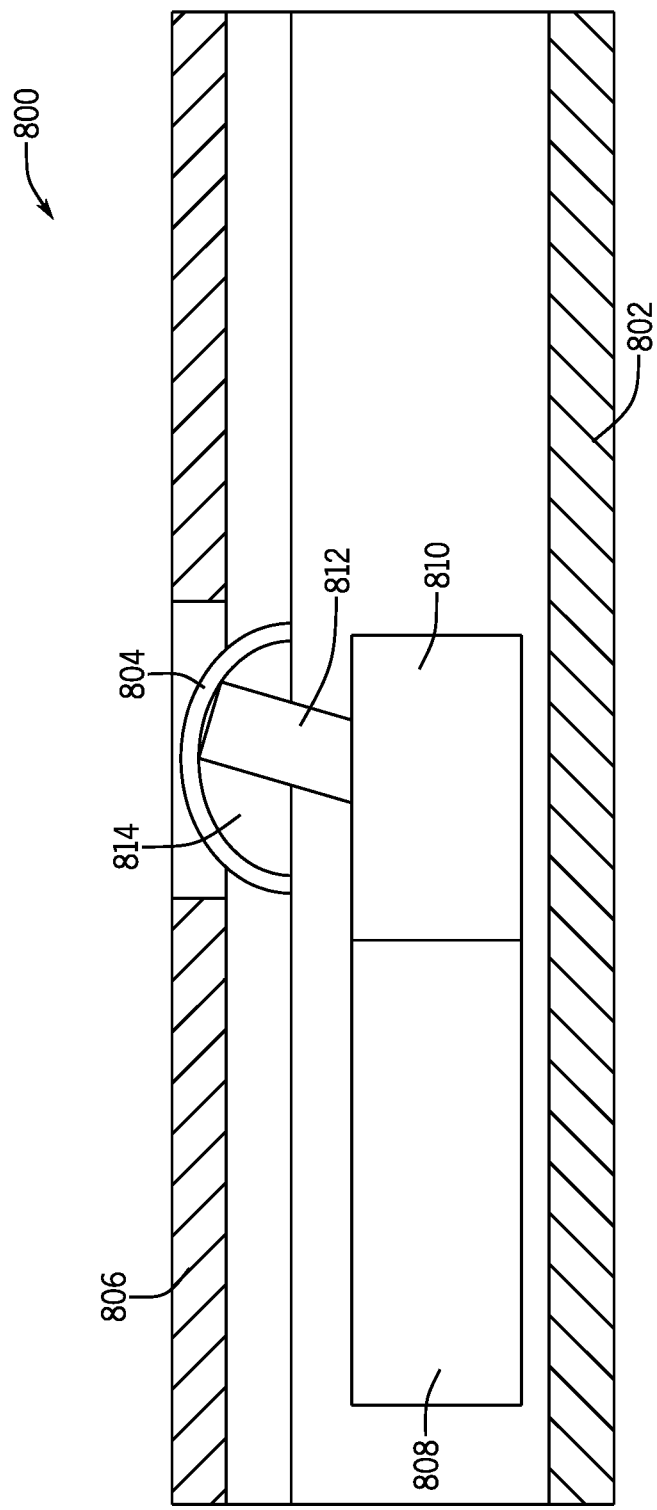
FIG. 8 depicts a schematic cross section diagram of a formation density logging tool having one or more window inserts, in accordance with an embodiment.

With the preceding in mind, FIG. 8 illustrates a formation density logging tool 800 having one or more window inserts 814. The formation density logging tool 800 may include a first housing 802, one or more detector windows 804, an external shield 806, one or more detectors including a photomultiplier 808 and a scintillator 810, a collimator 812, and one or more window inserts 814.

Each of the one or more detectors may include a scintillator 810 that absorbs the photons and emits light based on the energy of the absorbed photons. For example, each emission of light may count as a detected photon (e.g., thereby adding one to a count rate of the detector). Each of the one or more detectors may also include a photomultiplier 808 operatively coupled to the scintillator 810 to detect the light emitted by the scintillator 810. The photomultiplier 808 may output an electrical signal from the detected light of the scintillator. Processing of the electrical signals from the photomultiplier 808 may be performed at a data processing system at the surface and/or at a data processing system within the BHA. The collimator 812 may collimate scattered photons towards the one or more detectors. The collimator 812 may extend from the scintillator 810 to one of the one or more windows 804. The collimator 812 may have a central axis extending centrally through the length of the collimator from the scintillator 810 to one of the one or more detector windows 804. The collimator 812 may extend at least partially through an interior of the first housing 802. The collimator 812 may extend at least partially through one of the one or more window inserts 814.

The one or more detector windows 804 may be at least partially disposed in one or more recesses of the first housing 802. Further, the one or more detector windows 804 may be at least partially disposed in one or more recesses of the external shield 806. The one or more detector windows 804 may be capable of withstanding high wellbore pressures. For example, the one or more detector windows 804 may be capable of withstanding at least seventy MPa. The one or more detector windows 804 may be formed of a material having a small photoelectric cross section. For example, the one or more detector windows 804 may be formed of a material having a low atomic number. For example, the one or more detector windows may be formed of a material having an atomic number less than twenty-three. The one or more detector windows 804 may be formed of a material having a small Compton cross section. For example, the one or more detector windows 804 may be formed of a material having a low density. For example, the one or more detector windows 804 may be formed of a material having a density less than five grams per cubic centimeter. In certain embodiments, the one or more detector windows 804 may be formed of at least one of beryllium, titanium, an alloy of beryllium, an alloy of titanium, a carbon composite, a layered aluminum structure, or any combination thereof. The one or more detector windows 804 may be coupled to the first housing 802. For example, the one or more detector windows 804 may be welded, brazed, sealed with elastomeric materials, or any other suitable form of sealing.

The one or more window inserts 814 may extend the collimator 812 from the scintillator 810 to one of the one or more detector windows 804. The one or more window inserts 814 may be formed of a material having a high density. For example, the one or more window inserts 814 may be formed of a material having a density of at least eight grams per cubic centimeter. The one or more window inserts 814 may be formed of a material having a high atomic number. For example, the one or more window inserts 814 may be formed of a material having an atomic number of at least twenty-three. In certain embodiments, each of the one or more window inserts 814 may include a plurality of parts. The one or more window inserts 814 may shield the scintillator 810 from photons traveling in a particular direction. The one or more window inserts 814 may prevent a first portion of photons travelling in a particular direction from entering the collimator 812. For example, the one or more window inserts 814 may prevent a first portion of photons travelling in a direction substantially deviated from parallel to a central axis of the collimator 812. For example, the direction may be greater than five degrees from parallel to the central axis of the collimator 812. The one or more window inserts 814 may permit a second portion of photons travelling in a direction substantially parallel to the central axis of the collimator 812. For example, the one or more window inserts 814 may permit a second portion of photons travelling in a direction within five degrees of parallel to the central axis of the collimator 812.

Figure 9:
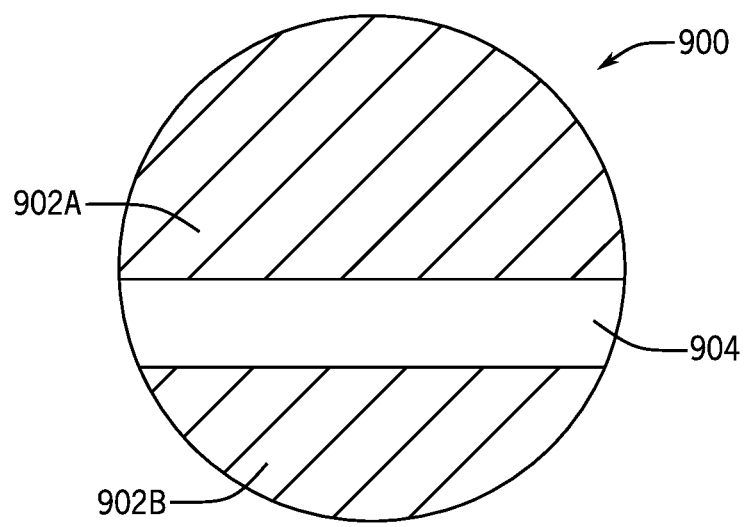
FIG. 9 depicts a schematic cross section diagram of a window insert having a collimation window, in accordance with an embodiment.

FIG. 9 depicts a schematic cross section diagram of a window insert 900 having a collimation window 904, in accordance with an embodiment. The window insert 900 may be disposed in a detector window of a formation density logging tool, such as detector window 804 in FIG. 8. The window insert 900 may be formed of a material having a high density. For example, the window insert 900 may be formed of a material having a density of at least eight grams per cubic centimeter. The window insert 900 may be formed of a material having a high atomic number. For example, the window insert 900 may be formed of a material having an atomic number of at least twenty-three. In certain embodiments, the window insert 900 may include a plurality of parts, such as first part 902A and second part 902B. The window insert 900 may prevent photons from entering the detector in a particular direction. For example, the window insert 900 may scatter and/or absorb any photon not travelling through the collimation window 904. The collimation window 904 may extend through the window insert 900. The collimation window 904 may be disposed between the first part 902A and second part 902B. In certain embodiments, the collimation window 904 may be filled with a material. The collimation window 904 may permit photons to travel from the geological formation through the collimation window 904 and to the detector.

Figure 10:
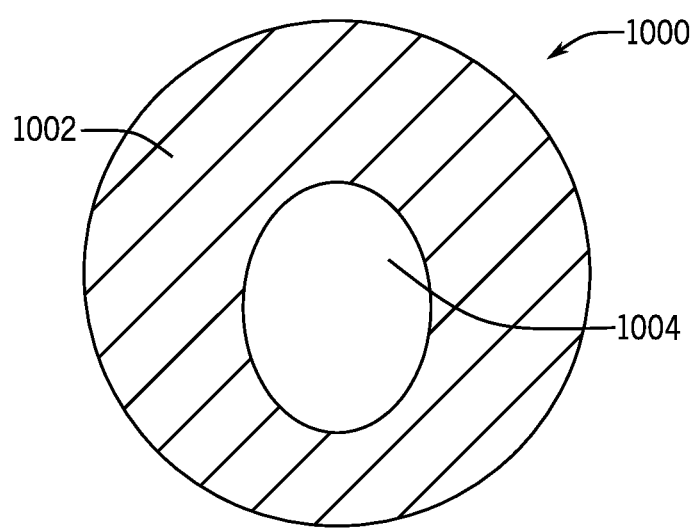
FIG. 10 depicts a schematic cross section diagram of a window insert having an aperture, in accordance with an embodiment.

FIG. 10 depicts a schematic cross section diagram of a window insert 1000 having an aperture 1004, in accordance with an embodiment. The window insert 1000 may be formed of a material having a high density. For example, the window insert 1000 may be formed of a material having a density of at least eight grams per cubic centimeter. The window insert 1000 may be formed of a material having a high atomic number. For example, the window insert 1000 may be formed of a material having an atomic number of at least twenty-three. In certain embodiments, the window insert 1000 may be formed from a single part 1002. The window insert 1000 may prevent photons from entering the detector in a particular direction. For example, the window insert 1000 may scatter and/or absorb any photon not travelling through the aperture 1004. The aperture 1004 may extend through the window insert 1000. In certain embodiments, the aperture 1004 may have an oval shape. In some embodiments, the aperture 1004 may have a circular shape. The aperture 1004 may permit photons to travel from the geological formation through the aperture 1004 and to the detector.

Figure 11:
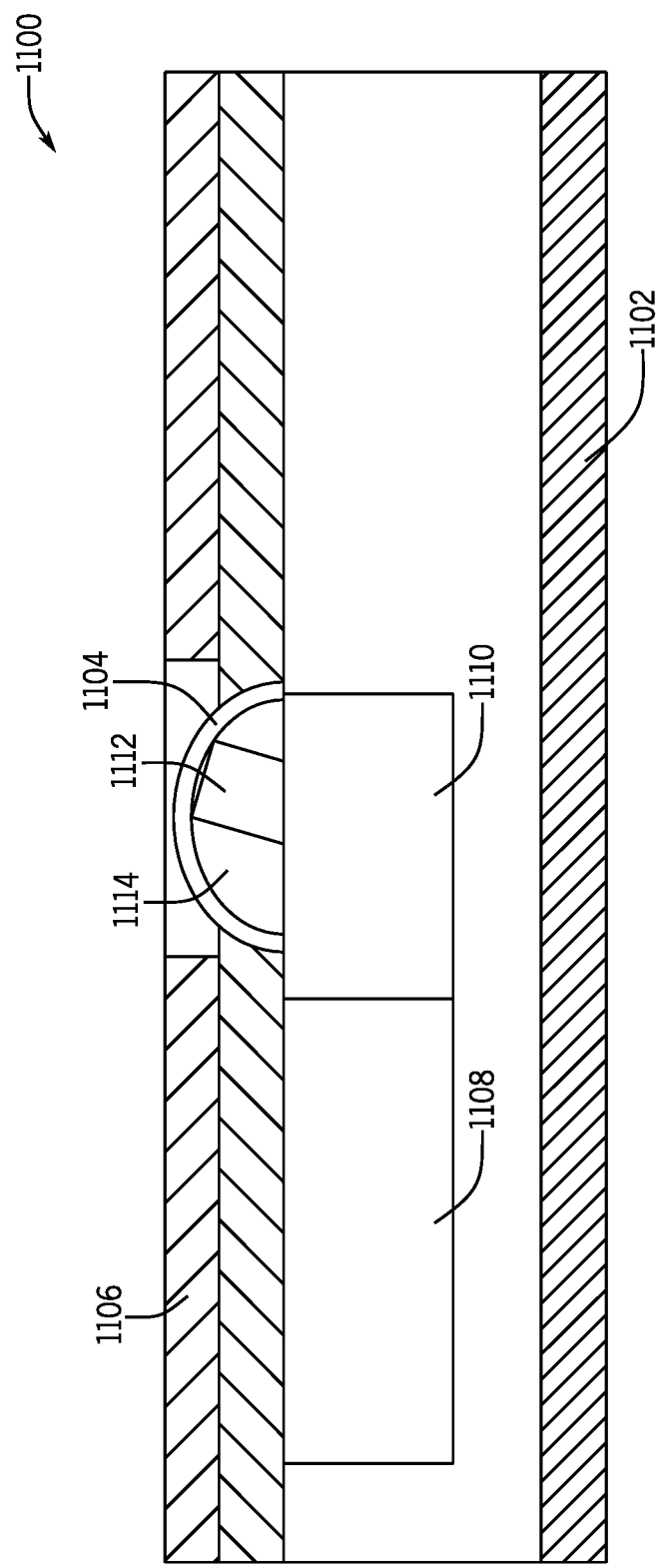
FIG. 11 depicts a schematic cross section diagram of a formation density logging tool having one or more window inserts, in accordance with an embodiment.

FIG. 11 depicts a schematic cross section diagram of a formation density logging tool 1100 having one or more window inserts 1114, in accordance with an embodiment. The formation density logging tool 1100 may include a first housing 1102, one or more detector windows 1104, an external shield 1106, one or more detectors including a photomultiplier 1108 and a scintillator 1110, a collimator 1112, and one or more window inserts 1114.

Each of the one or more detectors may include a scintillator 1110 that absorbs the photons and emits light based on the energy of the absorbed photons. For example, each emission of light may count as a detected photon (e.g., thereby adding one to a count rate of the detector). Each of the one or more detectors may also include a photomultiplier 1108 operatively coupled to the scintillator 1110 to detect the light emitted by the scintillator 1110. The photomultiplier 1108 may output an electrical signal from the detected light of the scintillator. Processing of the electrical signals from the photomultiplier 1108 may be performed at a data processing system at the surface and/or at a data processing system within the BHA. The scintillator 1110 may be disposed adjacent one of the one or more windows 1104. The collimator 1112 may collimate scattered photons towards the one or more detectors. The collimator 1112 may extend from the scintillator 1110 to one of the one or more windows 1104. The collimator 1112 may have a central axis extending centrally through the length of the collimator 1112 from the scintillator 1110 to one of the one or more detector windows 1104.

The one or more detector windows 1104 may be at least partially disposed in one or more recesses of the first housing 1102. Further, the one or more detector windows 1104 may be at least partially disposed in one or more recesses of the external shield 1106. The one or more detector windows 1104 may be capable of withstanding high wellbore pressures. For example, the one or more detector windows 1104 may be capable of withstanding at least seventy MPa. The one or more detector windows 1104 may be formed of a material having a small photoelectric cross section. For example, the one or more detector windows 1104 may be formed of a material having a low atomic number. For example, the one or more detector windows may be formed of a material having an atomic number less than twenty-three. The one or more detector windows 1104 may be formed of a material having a small Compton cross section. For example, the one or more detector windows 1104 may be formed of a material having a low density. For example, the one or more detector windows 1104 may be formed of a material having a density less than five grams per cubic centimeter. In certain embodiments, the one or more detector windows 1104 may be formed of at least one of beryllium, titanium, an alloy of beryllium, an alloy of titanium, a carbon composite, a layered aluminum structure, or any combination thereof. The one or more detector windows 1104 may be coupled to the first housing 1102. For example, the one or more detector windows 1104 may be welded, brazed, sealed with elastomeric materials, or any other suitable form of sealing.

The one or more window inserts 1114 may extend the collimator 1112 from the scintillator 1110 to one of the one or more detector windows 1104. The one or more window inserts 1114 may be formed of a material having a high density. For example, the one or more window inserts 1114 may be formed of a material having a density of at least eight grams per cubic centimeter. The one or more window inserts 1114 may be formed of a material having a high atomic number. For example, the one or more window inserts 1114 may be formed of a material having an atomic number of at least twenty-three. In certain embodiments, each of the one or more window inserts 1114 may include a plurality of parts. The one or more window inserts 1114 may shield the scintillator 1110 from photons traveling in a particular direction. The one or more window inserts 1114 may prevent a first portion of photons travelling in a particular direction from entering the collimator 1112. For example, the one or more window inserts 1114 may prevent a first portion of photons travelling in a direction substantially deviated from parallel to a central axis of the collimator 1112. For example, the direction may be greater than five degrees from parallel to the central axis of the collimator 1112. The one or more window inserts 1114 may permit a second portion of photons travelling in a direction substantially parallel to the central axis of the collimator 1112. For example, the one or more window inserts 1114 may permit a second portion of photons travelling in a direction within five degrees of parallel to the central axis of the collimator 1112.

Figure 12:
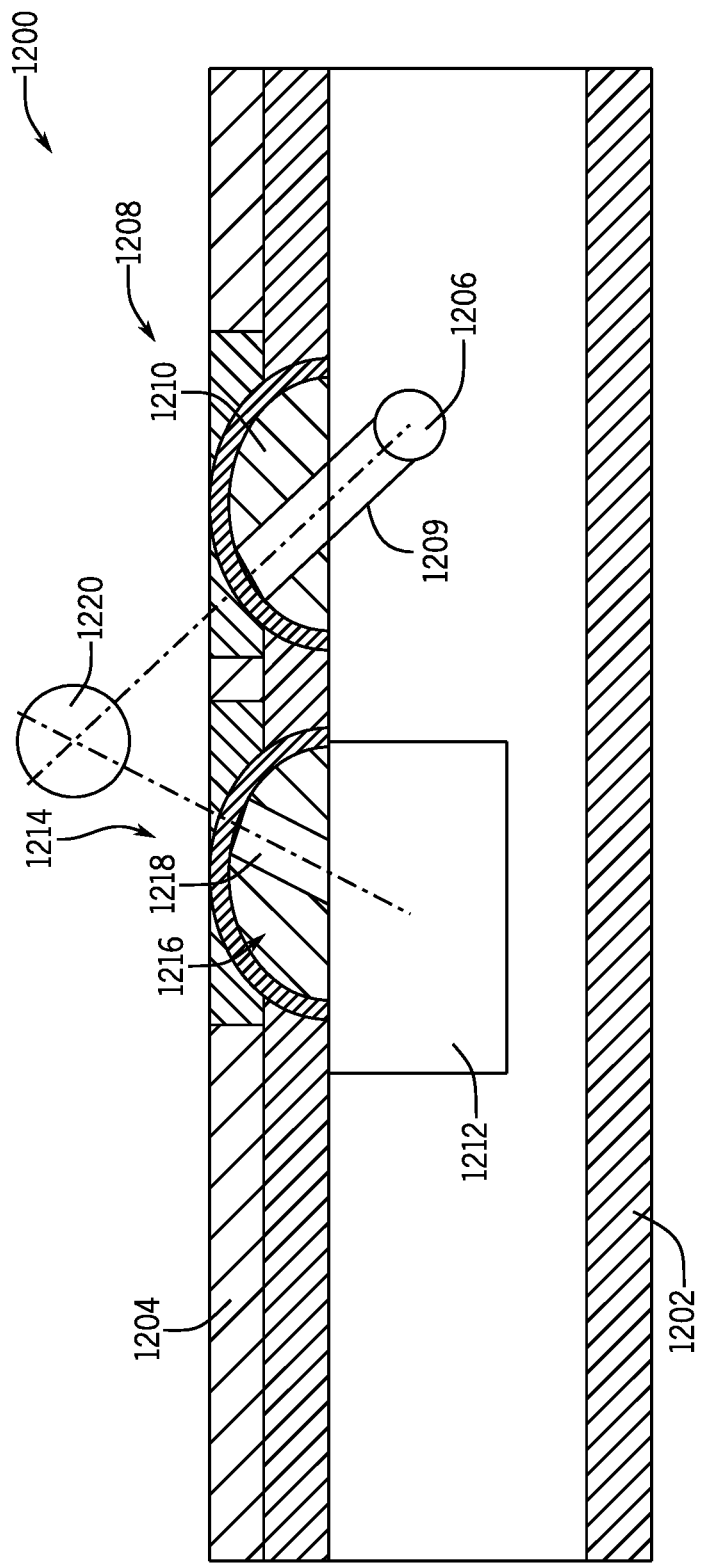
FIG. 12 depicts a schematic cross section diagram of a formation density logging tool having a window insert for a source and a window insert for a detector, in accordance with an embodiment.

FIG. 12 depicts a schematic cross section diagram of a formation density logging tool 1200 having a first window insert 1210 for a source 1206 and a second window insert 1216 for a detector 1212, in accordance with an embodiment. The formation density logging tool 1200 may include a first housing 1202, an external shield 1204, the source 1206, a source window 1208, a first window insert 1210, a detector 1212, a detector window 1214, a second window insert 1216, and a collimator 1218. The source 1206 may be a photon source, such as an x-ray generator, a gamma ray generator, a cesium source, or any other suitable source, that emits photons, such as x-rays, gamma rays, or other high-energy photons. High-energy photons may include photons at an energy sufficient to cause at least a portion of the photons to inelastically scatter off elements of the geological formation and to be absorbed by the detector 1212 (e.g., Compton scattering). In some embodiments, the source 1206 may emit the photons through a source collimator 1209, such that at least some of the photons enter the geological formation. At least some of the photons may interact with the geological formation (e.g., scatter) and may be redirected towards the detector 1212. In certain embodiments, the formation density logging tool 1200 may include one or more detectors. In some embodiments, at least one of the one or more detectors may be a short-spaced detector and at least one of the one or more detectors may be a long-spaced detector located farther from the source 1206 than the short-spaced detector.

The source 1206 may be disposed adjacent to the source window 1208. The source window 1208 may be at least partially disposed in a recess of the first housing 1202. Further, the source window 1208 may be at least partially disposed in a recess of the external shield 1204. The source window 1208 may be capable of withstanding high wellbore pressures. For example, the source window 1208 may be capable of withstanding at least seventy MPa. The source window 1208 may be formed of a material having a small photoelectric cross section. For example, the source window 1208 may be formed of a material having a low atomic number. For example, the source window 1208 may be formed of a material having an atomic number less than twenty-three. The source window 1208 may be formed of a material having a small Compton cross section. For example, the source window 1208 may be formed of a material having a low density. For example, the source window 1208 may be formed of a material having a density less than five grams per cubic centimeter. In certain embodiments, the source window 1208 may be formed of at least one of beryllium, titanium, an alloy of beryllium, an alloy of titanium, a carbon composite, a layered aluminum structure, or any combination thereof.

The source window 1208 may include the first window insert 1210. In certain embodiments, the first window insert 1210 may be formed from more than one part. In certain embodiments, the first window insert 1210 may be formed of a material having a high density. For example, the first window insert 1210 may be formed of a material having a density of at least eight grams per cubic centimeter. In certain embodiments, the first window insert 1210 may be formed of a material having a high atomic number. For example, the first window insert 1210 may be formed of a material having an atomic number greater than twenty-three. The first window insert 1210 may include a collimator 1209. The collimator 1209 may be disposed through the first window insert 1210. The collimator 1209 may have a central axis extending centrally through the length of the collimator 1209 from the source 1206 to the source window 1208. The first window insert 1210 may permit photons to exit the source 1206 in a direction substantially parallel to the central axis of the collimator 1209. For example, photons may exit the source within five degrees of parallel to the central axis of the collimator 1209. The first window insert 1210 may prevent photons from exiting the source in a direction substantially deviated from parallel to the central axis of the collimator 1209. For example, the first window insert 1210 may prevent photons from exiting the source in a direction greater than five degrees from parallel to the central axis of the collimator 1209. The first window insert 1210 may scatter and/or absorb photons travelling in the substantially deviated direction.

The detector 1212 may include a scintillator that absorbs the photons and emits light based on the energy of the absorbed photons. For example, each emission of light may count as a detected photon (e.g., thereby adding one to a count rate of the detector). Each of the one or more detectors may also include a photomultiplier operatively coupled to the scintillator to detect the light emitted by the scintillator. The photomultiplier may output an electrical signal from the detected light of the scintillator. Processing of the electrical signals from the photomultiplier may be performed at a data processing system at the surface and/or at a data processing system within the BHA. The detector 1212 may be disposed adjacent to the detector window 1214. The collimator 1218 may collimate scattered photons towards the detector 1212. The collimator 1218 may extend from the detector 1212 to the detector window 1214. The collimator 1218 may have a central axis extending centrally through the length of the collimator 1218 from the detector 1212 to the detector window 1214.

The detector window 1214 may be at least partially disposed in a recess of the first housing 1202. Further, the detector window 1214 may be at least partially disposed in a recess of the external shield 1204. The detector window 1214 may be capable of withstanding high wellbore pressures. For example, the detector window 1214 may be capable of withstanding at least seventy MPa. The detector window 1214 may be formed of a material having a small photoelectric cross section. For example, the detector window 1214 may be formed of a material having a low atomic number. For example, the detector window 1214 may be formed of a material having an atomic number less than twenty-three. The detector window 1214 may be formed of a material having a small Compton cross section. For example, the detector window 1214 may be formed of a material having a low density. For example, the detector window 1214 may be formed of a material having a density less than five grams per cubic centimeter. In certain embodiments, the detector window 1214 may be formed of at least one of beryllium, titanium, an alloy of beryllium, an alloy of titanium, a carbon composite, a layered aluminum structure, or any combination thereof. The detector window 1214 may be coupled to the first housing 1202. For example, the detector window 1214 may be welded, brazed, sealed with elastomeric materials, or any other suitable form of sealing.

The second window insert 1216 may extend the collimator 1218 from the detector 1212 to the detector window 1214. The second window insert 1216 may be formed of a material having a high density. For example, the second window insert 1216 may be formed of a material having a density of at least eight grams per cubic centimeter. The second window insert 1216 may be formed of a material having a high atomic number. For example, the second window insert 1216 may be formed of a material having an atomic number of at least twenty-three. In certain embodiments, the second window insert 1216 may include a plurality of parts. The second window insert 1216 may shield the detector 1212 from photons traveling in a particular direction. The second window insert 1216 may prevent a first portion of photons travelling in a particular direction from entering the collimator 1218. For example, the second window insert 1216 may prevent a first portion of photons travelling in a direction substantially deviated from parallel to a central axis of the collimator 1218. For example, the direction may be greater than five degrees from parallel to the central axis of the collimator 1218. The second window insert 1216 may permit a second portion of photons travelling in a direction substantially parallel to the central axis of the collimator 1218. For example, the second window insert 1216 may permit a second portion of photons travelling in a direction within five degrees of parallel to the central axis of the collimator 1218. In certain embodiments, the collimator 1218 may be formed at a different angle through the second window insert 1216. The angle of the collimator 1218 of the second window insert 1216 may be different than an angle of the collimator 1209 of the first window insert 1210. The angle of the collimator 1218 determines a depth of the scanning area 1220 in the geological formation. A shallower angle relative to a longitudinal axis of the formation density logging tool 1200 results in a scanning area at a shallower depth. The depth of the scanning area 1220 may increase up to a maximum depth when the angle of the collimator 1218 is perpendicular to the longitudinal axis of the formation density logging tool 1200.

Figure 13:
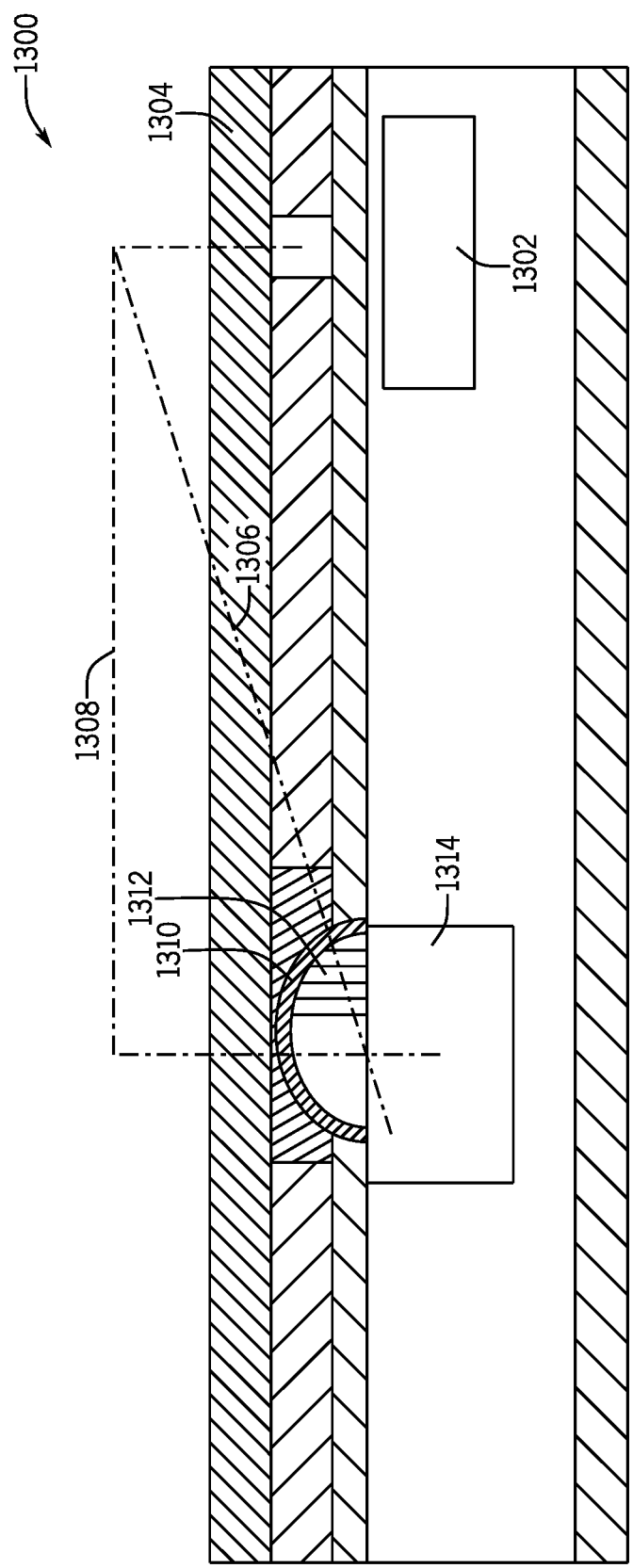
FIG. 13 depicts a schematic cross section diagram of a formation density logging tool having a window insert, in accordance with an embodiment.

FIG. 13 depicts a schematic cross section diagram of a formation density logging tool 1300 having a window insert, in accordance with an embodiment. The formation density logging tool 1300 may include a source 1302, a detector window 1310, a window insert 1312, and a detector 1314. The source 1302 may be a photon source, such as an x-ray generator, a gamma ray generator, a cesium source, or any other suitable source, that emits photons, such as x-rays, gamma rays, or other high-energy photons. High-energy photons may include photons at an energy sufficient to cause at least a portion of the photons to inelastically scatter off elements of the geological formation and to be absorbed by the detector 1314 (e.g., Compton scattering). The source 1302 emits the photons such that at least some of the photons enter the geological formation. At least some of the photons may interact with the geological formation (e.g., scatter) and may be redirected towards the detector 1314. In certain embodiments, the formation density logging tool 1300 may include one or more detectors. In some embodiments, at least one of the one or more detectors may be a short-spaced detector and at least one of the one or more detectors may be a long-spaced detector located farther from the source 1302 than the short-spaced detector.

The source 1302 may emit a first photon which travels along a first path 1306. The photon travelling along the first path 1306 may exit the source and travel through a debris layer 1304 disposed on the outer surface of the formation density logging tool 1300. The debris layer 1304 may be a layer of particulates formed from drilling mud. The photon travelling along the first path 1306 may scatter off of a surface of the geological formation and pass through the debris layer 1304 and a portion of the housing of the formation density logging tool 1300. Due to the first path 1306 not travelling substantially through the geological formation, the corresponding photon carries little information about the geological formation. The window insert 1312 may prevent the photon travelling along the first path 1306 from entering the detector 1314. For example, the window insert 1312 may shield the detector from the photon. The window insert 1312 may scatter and/or absorb the photon travelling along the first path 1306.

The source 1302 may emit a second photon which travels along a second path 1308. The photon travelling along the second path may exit the source and travel through the debris layer 1304 disposed on the outer surface of the formation density logging tool 1300. The photon travelling along the second path 1308 scatters off the geological formation at a first scattering point. The photon travelling along the second path 1308 continues travelling through the geological formation until reaching a second scattering point at which the photon scatters towards the detector 1314. The window insert 1312 may be configured to permit the photon travelling along the second path 1308 to enter the detector. The window insert 1312 may shield the detector 1314 from photons travelling in a range of directions. For example, the window insert 1312 may be configured to shield the detector 1314 from photons travelling in a direction up to seventy degrees from the longitudinal axis of the logging tool 1300. The window insert 1312 may be configured to permit photons travelling in a direction between seventy degrees and one hundred and fifty degrees from the longitudinal axis of the logging tool 1300. The window insert 1312 may be formed of a material having a high density. For example, the window insert 1312 may be formed of a material having a density of at least eight grams per cubic centimeter. The window insert 1312 may be formed of a material having a high atomic number. For example, the window insert 1312 may be formed of a material having an atomic number of at least twenty-three.

Figure 14:
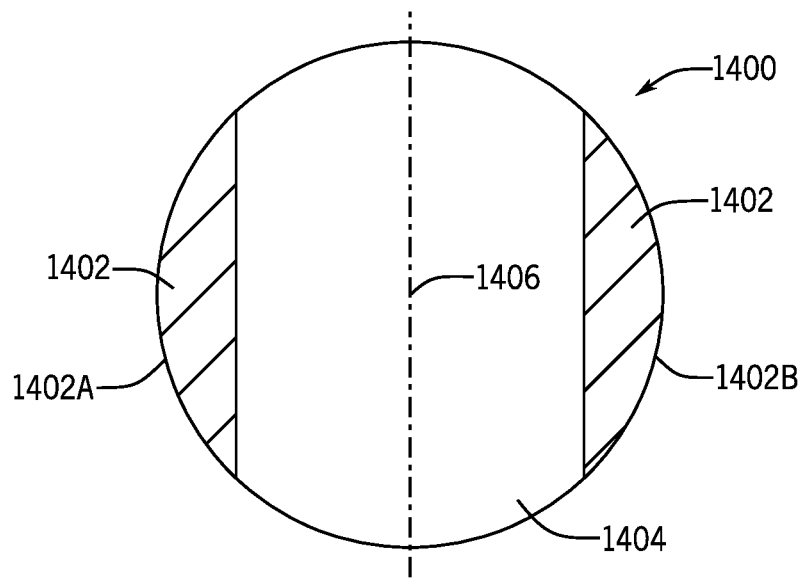
FIG. 14 depicts a schematic cross section diagram of a window insert, in accordance with an embodiment.

FIG. 14 depicts a schematic cross section diagram of a window insert 1400, in accordance with an embodiment. The window insert 1400 may be disposed in a detector window of a formation density logging tool, such as detector window 804 in FIG. 8. The window insert 1400 may prevent photons from entering a detector. The window insert 1400 may be formed of a material having a high density. For example, the window insert 1400 may be formed of a material having a density of at least eight grams per cubic centimeter. The window insert 1400 may be formed of a material having a high atomic number. For example, the window insert 1400 may be formed of a material having an atomic number of at least twenty-three. The window insert 1400 may include a shield 1402. The shield 1402 may include a plurality of shielding parts. For example, the shield 1402 may include a first shield part 1402A and a second shield part 1402B. The first shield part 1402A may be disposed on an opposite side of a longitudinal axis 1406 of a formation density logging tool from the second shield part 1402B. The window insert 1400 may prevent photons from entering a detector in a direction perpendicular to the longitudinal axis 1406 of the formation density logging tool. In certain embodiments, the window insert 1400 may prevent photons from entering a detector in a direction up to sixty degrees from perpendicular to the longitudinal axis 1406 of the formation density logging tool. The window insert 1400 may prevent photons from entering the detector from a first side adjacent the first shield part 1402A and/or a second side adjacent the second shield part 1402B. Photons may enter the detector through the opening 1404 in the window insert 1400.

Figure 15:
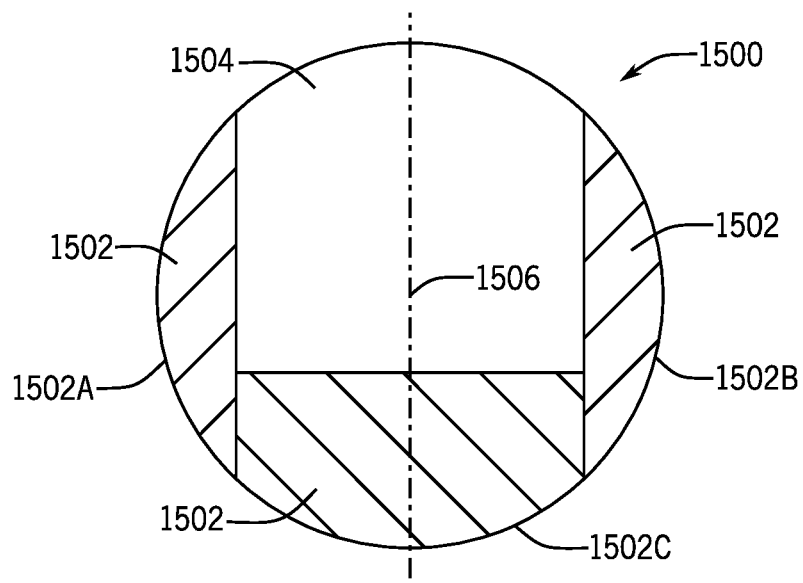
FIG. 15 depicts a schematic cross section diagram of another window insert including a plurality of shield parts, in accordance with an embodiment.

FIG. 15 depicts a schematic cross section diagram of a window insert 1500 having a plurality of shield parts 1502A, 1502B, 1502C, in accordance with an embodiment. The window insert 1500 may be disposed in a detector window of a formation density logging tool, such as detector window 804 in FIG. 8. The window insert 1500 may prevent photons from entering a detector. The window insert 1500 may be formed of a material having a high density. For example, the window insert 1500 may be formed of a material having a density of at least eight grams per cubic centimeter. The window insert 1500 may be formed of a material having a high atomic number. For example, the window insert 1500 may be formed of a material having an atomic number of at least twenty-three. The window insert 1500 may include a shield 1502. The shield 1502 may include a plurality of shielding parts. For example, the shield 1502 may include a first shield part 1502A, a second shield part 1502B, and a third shield part 1502C. The first shield part 1502A may be disposed on an opposite side of a longitudinal axis 1506 of a formation density logging tool from the second shield part 1502B. The window insert 1500 may prevent photons from entering a detector in a direction perpendicular to the longitudinal axis 1506 of the formation density logging tool. In certain embodiments, the window insert 1500 may prevent photons from entering a detector in a direction up to sixty degrees from perpendicular to the longitudinal axis 1506 of the formation density logging tool. The window insert 1500 may prevent photons from entering the detector from a first side adjacent the first shield part 1502A and/or a second side adjacent the second shield part 1502B. The third shield part 1502C may prevent photons from entering the detector at an angle up to seventy degrees from the longitudinal axis of the formation density logging tool. Photons may enter the detector through the opening 1504 in the window insert 1500.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A downhole tool, comprising:
   a radiation source configured to emit radiation;
   a detector window comprising:
     a dome having a first surface and a second surface; and
     a support structure configured to provide support for the dome;
   a detector configured to detect a first portion of the radiation through the detector window after the radiation has interacted with a geological formation;
   a window insert positioned in the detector window; and
   a collimator extending at least partially through the window insert, the collimator configured to allow the first portion of the radiation that is travelling in a direction substantially parallel to a central axis of the collimator to pass through the collimator to the detector,
   wherein the window insert is configured to shield the detector from a second portion of the radiation that is travelling in a direction that is substantially deviated from parallel to the central axis of the collimator.

2. The downhole tool of claim 1, wherein the support structure is disposed between the first surface and the second surface.

3. The downhole tool of claim 1, wherein the support structure includes a plurality of columns.

4. The downhole tool of claim 1, wherein the detector window is formed using an additive manufacturing process.

5. The downhole tool of claim 1, wherein the support structure has a corrugated shape.

6. The downhole tool of claim 1, wherein the support structure is disposed in an interior cavity of the dome.

7. The downhole tool of claim 1, wherein the detector window comprises titanium, beryllium, an alloy of titanium, an alloy of beryllium, a carbon composite, a layered aluminum structure or any combination thereof.

8. The downhole tool of claim 1, wherein the first surface of the dome has an arcuate shape protruding in a convex manner relative to the detector and centered about a dome central axis, wherein the central axis of the collimator is oblique relative to the dome central axis.

9. The downhole tool of claim 1, further comprising a source window including a second window insert including a source collimator extending therethrough, the source collimator configured to allow radiation that is travelling in a direction substantially parallel to a source collimator central axis to pass through the window insert.

10. The downhole tool of claim 9, wherein:
the collimator is a detector collimator, the central axis of the collimator is a detector collimator central axis, the first surface of the dome has an arcuate shape protruding in a convex manner relative to the detector and centered about a detector dome central axis, and the source window includes a source dome having a first surface having an arcuate shape protruding in a convex manner relative to the radiation source and centered about a source dome central axis; and
the detector collimator central axis is at a first angle relative to the detector dome central axis, the source collimator central axis is at a second angle relative to the source dome central axis, and the first angle is not equal to the second angle.

11. A detector window for a radiation-based downhole well-logging logging tool, comprising:
a dome having a first surface and a second surface, the first surface having an arcuate shape and centered about a dome central axis;
a support structure configured to provide support for the dome, the support structure disposed between the first surface of the dome and the second surface of the dome;
a window insert configured to absorb radiation; and
a collimator extending at least partially through the window insert, the collimator configured to allow radiation travelling in a direction substantially parallel to a collimator central axis to pass through the window insert, the collimator central axis being oblique relative to the dome central axis.

12. The detector window of claim 11, wherein the support structure is disposed in an interior cavity of the dome.

13. The detector window of claim 11, wherein the support structure includes a plurality of columns.

14. The detector window of claim 11, wherein the window insert comprises a material having an atomic number greater than twenty-three.

15. The detector window of claim 11, wherein the dome comprises titanium, beryllium, an alloy of titanium, an alloy of beryllium, or any combination thereof.

16. The detector window of claim 11, wherein the collimator is configured to allow radiation travelling within five degrees of parallel to the collimator central axis to pass through the window insert.

17. A downhole tool, comprising:
a source configured to emit a plurality of photons;
a detector configured to detect a first portion of the plurality of photons scattered off of a geological formation; and
a detector window comprising:
a window insert configured to shield the detector from a second portion of the plurality of photons; and
a collimator extending at least partially through the window insert, the collimator configured to allow the first portion of the plurality of photons to pass through the collimator to the detector.

18. The downhole tool of claim 17, wherein the window insert comprises a material having an atomic number greater than twenty-three.

19. The downhole tool of claim 17, wherein the detector window is formed using an additive manufacturing process.

20. The downhole tool of claim 17, further comprising:
a source window comprising:
a second window insert configured to collimate the plurality of photons that are emitted.

* * * * *